April 10, 1928.                                                          1,665,313
J. D. LEWIS
PROTECTIVE DEVICE FOR THREE-PHASE ALTERNATING CURRENT UNITS
Filed April 27, 1923
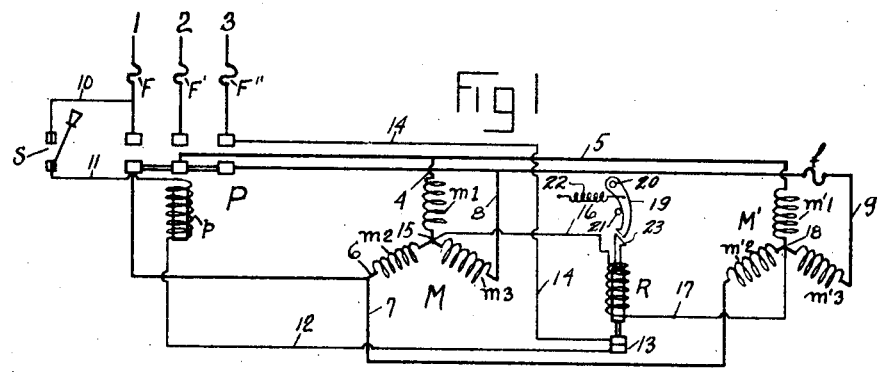
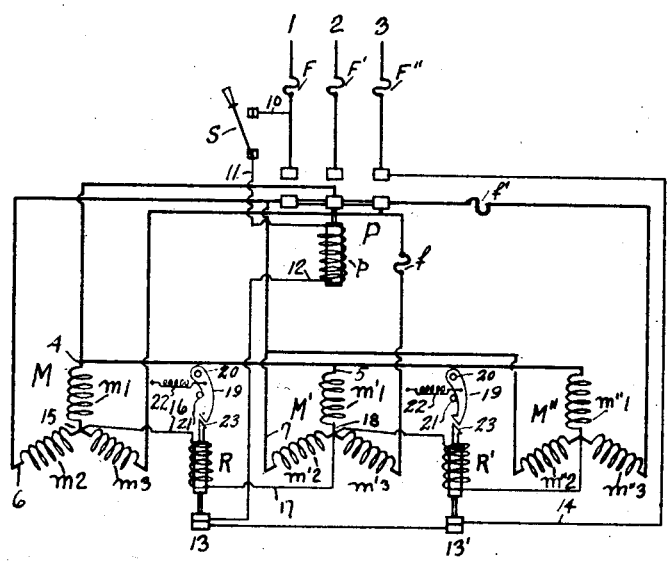
Inventor
Jacob D. Lewis
By his Attorney
L. H. Campbell Patented Apr. 10, 1928.

1,665,313

UNITED STATES PATENT OFFICE.

JACOB D. LEWIS, OF YONKERS, NEW YORK, ASSIGNOR TO OTIS ELEVATOR COMPANY, OF JERSEY CITY, NEW JERSEY, A CORPORATION OF NEW JERSEY.

PROTECTIVE DEVICE FOR THREE-PHASE ALTERNATING-CURRENT UNITS.

Application filed April 27, 1923. Serial No. 634,931.

My invention relates to controlling apparatus for electric units and more particularly to three phase alternating current units.

The object of my invention is to provide means for protecting one or more three phase units against any damage that might result from single phase being imposed upon the windings of either as a result of the failure of a circuit to either or as a result of the opening of any winding within either unit.

It often happens in the control of alternating current motors, brakes, switches and the like, that an abnormal single phase current may be impressed upon one unit as a result of a failure of a circuit within one of the windings or a failure of any one of the leads to one of the units. The effect of this singe phase is the eventual burning out of the unit if the current is allowed to remain on long enough. It is the object of my invention to provide means to cut off the supply current should this single phase condition exist.

In the drawings, Figure 1 shows an application of my invention to a control system containing two three phase units and magnet operated main line switch.

Figure 2 shows an application to a control system containing three three phase units and magnet operated main line switch.

Referring to Figures 1 and 2, unit M is shown as the stator of an alternating current motor having three phase windings $m_1$, $m_2$, and $m_3$ star connected, but may be any three phase star connected unit. Units M' and M'' represent three phase units having star connected windings and while shown as stator windings of motors, may be brake magnet windings, relay windings, resistances or the like. Magnet switch P with coil $p$ is shown as a main line switch to control operation of motor and other three phase units but may be replaced by the well known magnet reversing switches to interrupt the main line. Switch S may be any manually operated type of switch and is used for controlling magnet switch P. Switches R and R' are relay magnet switches having breaking contacts 13 and 13' respectively and are so arranged that after the switch has operated and opened its contacts, the latter will latch open in any well known way and cannot close by the de-energization of the magnet coil but must be reset by hand. For example, referring to Figure 1, a member 19 is pivotally mounted on pin 20 and when relay contact 13 is closed, member 19 is held against stop 21 by spring 22. A projection 23 on an extension of the core of relay R is adapted to engage member 19 when the relay opens its contact. To reclose the contact, member 19 is disengaged manually by moving it against the action of spring 22. The coil of magnet R is connected between the neutral point 15 of motor windings and neutral point 18 of the three phase unit M', while the coil of magnet R' is connected between the neutral points of three phase units M' and M''. The breaking contacts of relays R and R' are connected in series in the circuit of coil of main line magnet switch P.

Fuses F, F' and F'' are main line fuses for the motor circuit; $f$ is a fuse in one of the leads to unit M' and $f'$ is a fuse in one of the leads to unit M''.

I will first describe the operation obtained by units as shown in Figure 1. In order to operate motor M, switch S is closed. This makes circuit for magnet switch P from supply line 1, wire 10, switch S, wire 11, coil $p$, wire 12, contact 13, and wire 14 to supply line 3. Magnet switch P will then close its contacts and put current on stator windings of motor and on windings of three phase unit M'. The motor M will then run and unit M' will be energized so that it will perform its required function.

Under the conditions just outlined the switch R will not operate as the voltage between neutral points 15 and 18 is zero provided the line fuses are intact and no open circuits exist in any of the windings of the three phase units or in the leads thereto.

Assume however that an open circuit exists in winding $m'_1$ for instance. The closing of switch S and subsequent closing of magnet switch P will impose three phase current on windings of unit M and single phase current on windings $m'_2$ and $m'_3$ of unit M'. If this condition were allowed to continue, the windings of unit M' would be damaged. Furthermore if unit M' were a brake magnet the brake would not release under these conditions and full voltage would be impressed upon the motor at standstill, assuming of course that brake is connected to motor shaft. This would result in a dangerously excessive current in motor windings M.

However, as soon as switch P closes under this abnormal condition a difference of voltage exists between neutral points 15 and 18. This voltage will operate relay R, which will open its contacts 13, thereby interrupting the circuit to coil of switch P, which in turn will open and cut off current from both three phase units.

The abnormal condition just outlined was a result of an open circuit in winding $m'_1$, of unit M'. The same effect would be obtained by a failure of fuse $f$ or by an open circuit in either winding $m'_2$ or $m'_3$ or any one of leads 5, 7 or 9.

An open circuit in windings $m_1$, $m_2$ or $m_3$ or leads 4, 6 or 8, would have the same general result, except that in the latter case the motor would receive single phase current at standstill, while the other three phase unit would be fully energized. Under this abnormal condition, switch R will operate in the same way as outlined above and remove current from both three phase units.

Referring to modification shown in Figure 2, it will be noted that this arrangement shows two three phase units, M' and M'', in addition to motor unit M. Also, with this scheme, two relays R and R' are used, the coil of R connected as before and that of R' between neutral of units M' and M'', or between neutral of units M and M'' (not shown). The breaking contacts of the two relays are connected in series in circuit of coil $p$. This arrangement will cause an operation of either relay R or R' in the event of failure of any winding in either of units M, M' or M'', the failure of any lead thereto or the failure of either fuse $f$ or $f'$, in exactly the same way as outlined in connection with Figure 1.

By having relay switches R and R' self locking with their contacts open as outlined above, further current cannot be imposed on either of the three phase units until these relays are reset. It is obvious that trouble causing either switch R or R' to operate should be remedied before these switches are reset.

I have shown only one fuse $f$ and $f'$ in circuits of units M' and M'' respectively. This fuse is of use primarily if units M' or M'' are brake magnets. In this event, should the brake fail to lift due to some cause such as mechanical interference or friction, excessive current in brake magnet would result and either relay R or R' would operate as a result of failure of either fuse $f$ or $f'$ and thereby remove current from all three units as outlined above.

I wish it to be understood that my invention is not limited to the details or construction or arrangement of parts herein disclosed, and that various modifications might be made within the spirit and scope of the invention.

What I claim and desire to secure by Letters Patent of the United States is:—

1. The combination of a plurality of three phase star connected units, a source of power supply, switching means for connecting the units in parallel to the source of supply, means responsive to a difference of potential between the neutral points of two of said units for disconnecting all of said units from said source of supply, and means for causing such difference of potential upon the occurrence of balanced overload conditions on one of said two units.

2. The combination of a plurality of three phase star connected units, a source of power supply, a magnet switch for connecting said units in parallel to the source of supply, a magnet relay having its coil connected between the neutral points of two of the units, a contact on said relay in circuit with the coil of said switch, and means for opening one phase of one of said two units upon the current in that phase exceeding a predetermined amount, whereupon said relay will operate to cause said magnet switch to disconnect all of the units from the source of power supply.

3. The combination of a plurality of three phase star connected units, a source of power supply, a magnet switch for connecting said units in parallel to the source of supply, a magnet relay having its coil connected between the neutral points of two of the units, a contact on said relay in circuit with the coil of said switch, and a fuse in one phase of one of said two units for causing a difference of potential between the neutral points of said two units in the event of an overload opening said fuse, whereupon said relay will act to disconnect all the units from the source of supply by deenergizing the coil of the magnet switch.

4. The combination of a plurality of three phase star connected units, a source of power supply, a magnet switch for connecting said units in parallel to the source of supply, a magnet relay having its coil connected between the neutral points of two of the units, a contact on said relay in circuit with the coil of said switch, manually releasable latching means for holding said relay contact open, and means for opening one phase of one of said two units upon the current in that phase exceeding a predetermined amount, whereupon said relay will operate to cause said magnet switch to disconnect all of the units from the source of power supply.

In testimony whereof, I have signed my name to this specification.

JACOB D. LEWIS.